(12) United States Patent
Jensen (10) Patent No.: US 11,339,031 B2
(45) Date of Patent: May 24, 2022

(54) GRIPPER FOR HOLDING A WIND TURBINE BLADE AND METHOD OF HOLDING A WIND TURBINE BLADE

(71) Applicant: Vestas Wind Systems A/S, Aarhus N. (DK)

(72) Inventor: Kurt Jensen, Arhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 30 days.

(21) Appl. No.: 16/955,175

(22) PCT Filed: Dec. 13, 2018

(86) PCT No.: PCT/DK2018/050361
§ 371 (c)(1),
(2) Date: Jun. 18, 2020

(87) PCT Pub. No.: WO2019/120413
PCT Pub. Date: Jun. 27, 2019

(65) Prior Publication Data
US 2020/0317474 A1  Oct. 8, 2020

(30) Foreign Application Priority Data
Dec. 20, 2017  (DK) .......................... PA 2017 70969

(51) Int. Cl.
*B66C 1/10* (2006.01)
*F03D 13/40* (2016.01)

(52) U.S. Cl.
CPC .............. *B66C 1/108* (2013.01); *F03D 13/40* (2016.05)

(58) Field of Classification Search
CPC ....... B66C 1/108; B66C 23/185; B66C 13/08; B66C 1/10; F03D 13/10; F03D 1/0658;
(Continued)

(56) References Cited

U.S. PATENT DOCUMENTS

| 7,670,090 B1 | 3/2010 | Landrum et al. |
| 2012/0114443 A1 | 5/2012 | Cyrus et al. |

FOREIGN PATENT DOCUMENTS

| CN | 103447978 A | 12/2013 |
| CN | 104386570 A | 3/2015 |

(Continued)

OTHER PUBLICATIONS

China National Intellectual Property Administration, First Notification of Office Action in CN Application No. 201880088423.X, dated Sep. 15, 2021.

(Continued)

*Primary Examiner* — Moshe Wilensky
(74) *Attorney, Agent, or Firm* — Wood Herron & Evans LLP (57) ABSTRACT

A gripper for holding a wind turbine blade when the wind turbine blade is being transported. The gripper comprises a lower blade holding structure configured to engage an underside of the wind turbine blade, an upper blade holding structure configured to engage an upper side of the wind turbine blade and a force transfer mechanism operatively coupled to at least one of the lower or upper blade holding structures. The force transfer mechanism is configured to increase the force applied between the lower blade holding structure and the underside of the wind turbine blade and/or between the upper blade holding structure and the upper side of the wind turbine blade when the wind turbine blade is accelerated during movement along a central longitudinal axis of the wind turbine blade.

20 Claims, 7 Drawing Sheets

(58) Field of Classification Search
CPC ...... F03D 80/00; F03D 13/40; F05D 2230/68; F05D 2230/61; F05D 2260/02; F05D 2260/50

See application file for complete search history.

(56) References Cited

FOREIGN PATENT DOCUMENTS

| | | |
|---|---|---|
| EP | 2418376 A1 | 2/2012 |
| EP | 2474669 A1 | 7/2012 |
| EP | 2669508 A1 | 12/2013 |
| EP | 2796709 A1 | 10/2014 |
| EP | 2873641 A1 | 5/2015 |
| WO | 2009141018 A2 | 11/2009 |
| WO | 2017114530 A1 | 7/2017 |

OTHER PUBLICATIONS

Danish Patent and Trademark Office, Search and Examination Report in PA 2017 70969, dated Jul. 12, 2018.
European Patent Office, International Search Report and Written Opinion in PCT Application No. PCT/DK2018/050361, dated Mar. 1, 2019.

GRIPPER FOR HOLDING A WIND TURBINE BLADE AND METHOD OF HOLDING A WIND TURBINE BLADE

TECHNICAL FIELD

The present invention generally relates to apparatus for holding wind turbine blades and, specifically, for preventing slippage between the blade and the holding structure during movement such as transport or lifting operations.

BACKGROUND

Wind turbine blades are very lengthy and unwieldy elements. These blades need to be moved, such as during transporting and lifting operations between the time the blade is manufactured and the time it is installed on a wind turbine. During transportation or other handling, the blade is typically held in a frame or gripper and may be subject to axial acceleration. Such acceleration may result in slippage of the blade along its central longitudinal axis or axial direction relative to the frame or gripper. This may destabilize the blade during any lifting or transportation operation.

In many instances, it is proposed to prevent axial slippage of the blade by securing a bracket-type frame element to the root face of the blade. By immobilizing the bracket-type frame element on, for example, a transport platform, axial slippage or movement of the blade relative to the gripper or frame in either forward or backward directions may be prevented. Examples of this type of blade frame are found, for example, in EP2418376, EP2796709, and U.S. Pat. No. 7,670,090.

It has also been suggested to use clamp-type blade frames. WO2009/141018 discloses a cushion at a movable clamping arm face, opposite to a fixed clamp face. But, the clamping force applied to the blade is not easy to set. Moreover, the cushion at the clamp pad may be subject to compression creep or loss of elasticity, compromising the ability of the frame to axially restrain a blade under positive or negative acceleration conditions. Loading and unloading this type of frame may also be time consuming.

It has also been suggested to use friction pads in a blade gripper to prevent a tendency for the blade to slide laterally out from a tilted blade gripper.

In some instances, it is not desirable or possible to position a blade frame or gripper at the root face of the blade. For example, a blade-lifting gripper needs to be positioned near the center of gravity of the blade for balanced lifting or movement. In some instances, a transport platform such as a truck bed or rail car may be shorter than the blade. Transport dynamics may require that the blade root overhang the end of a transport platform. In such a case, it is necessary to support the blade at a point near its root, but away from the root face, raising the problem of axially restraining or preventing axial slippage of the blade.

For these and possibly further reasons, it would be desirable to provide a gripper to better address blade slippage issues during transport and lifting operations.

SUMMARY

Generally, the invention provides a gripper for holding a wind turbine blade when the wind turbine blade is being moved, such as during transport and lifting. The gripper includes a lower blade holding structure configured to engage an underside of the wind turbine blade, an upper blade holding structure configured to engage an upper side of the wind turbine blade and a force transfer mechanism operatively coupled to at least one of the lower or upper blade holding structures. The force transfer mechanism is configured to increase the force applied between the lower blade holding structure and the underside of the wind turbine blade and/or between the upper blade holding structure and the upper side of the wind turbine blade when the wind turbine blade is accelerated during movement along a central longitudinal axis of the wind turbine blade. The force transfer mechanism and the upper and lower blade holding structures may take various forms.

In various illustrative embodiments, the force transfer mechanism further includes a linkage assembly. The linkage assembly further includes a first link coupled to a first friction pad having a first surface configured to contact a surface of the wind turbine blade. The first link defines an acute angle between a length thereof and the central longitudinal axis of the wind turbine blade. The linkage assembly further includes a second link coupled to a second friction pad having a second surface configured to contact a surface of the wind turbine blade. The second link defines an acute angle between a length thereof and the central longitudinal axis of the wind turbine blade. The first and second links are oriented in generally opposite directions and extend along the central longitudinal axis of the blade.

A release mechanism is coupled to the linkage assembly and allows the first and second friction pads to be selectively disengaged from the surface of the wind turbine blade. This allows the gripper to be selectively applied and released to and from the blade during blade movement operations.

In one embodiment, the force transfer mechanism is coupled to the upper blade holding structure, and further comprises a friction pad coupled to the lower blade holding structure and configured to engage the underside of the wind turbine blade.

In further embodiments the force transfer mechanism may include first and second friction elements. The first friction element includes a first friction surface configured to engage a surface of the wind turbine blade and a second angled surface extending along and at an acute angle to the central longitudinal axis of the wind turbine blade. The second friction element includes a third angled surface extending parallel to the second angled surface.

The second and third angled surfaces contact and move against each other to increase the force applied between the first friction surface and the surface of the wind turbine blade when the wind turbine blade is accelerated in a first direction during movement along a central longitudinal axis of the wind turbine blade.

In another embodiment the first friction element further includes a fourth angled surface extending along and at an acute angle to the central longitudinal axis and the second friction element further includes a fifth angled surface extending parallel to the fourth angled surface, i.e., at an acute angle to the central longitudinal axis. The fourth and fifth angled surfaces contact and move against each other to increase the force applied between the first friction surface and the surface of the wind turbine blade (in a direction normal to the blade surface) when the wind turbine blade is accelerated in a second direction opposite to the first direction during movement along a central longitudinal axis of the wind turbine blade.

In another embodiment the force transfer mechanism further includes a pivot mounting coupled to at least one of the upper or lower blade holding structures. The pivot mounting is further coupled to a friction element engageable with a surface of the wind turbine blade, whereby the friction element pivots to increase the force applied between the friction element and the surface of the wind turbine blade (in a direction normal to the blade surface) when the wind turbine blade is accelerated during movement along a central longitudinal axis of the wind turbine blade.

The invention also generally provides a method of holding a wind turbine blade when the wind turbine blade is being moved, such as during transportation or lifting. The method includes engaging an underside of the wind turbine blade with a lower blade holding structure, and engaging an upper side of the wind turbine blade with an upper blade holding structure. The method further comprises increasing the force applied between the lower blade holding structure and the underside of the wind turbine blade and/or between the upper blade holding structure and the upper side of the wind turbine blade using a force transfer mechanism when the wind turbine blade is accelerated during movement along a central longitudinal axis of the wind turbine blade.

The method may further comprise increasing the force through the use of a linkage assembly. Increasing the force may occur through a first link coupled to a first friction pad contacting a surface of the wind turbine blade. The first link defines an acute angle between a length thereof and the central longitudinal axis of the wind turbine blade. The method may further comprise increasing the force through a second link coupled to a second friction pad contacting a surface of the wind turbine blade. The second link also defines an acute angle between a length thereof and the central longitudinal axis of the wind turbine blade. The method may further include selectively engaging and disengaging the friction pad(s) with respect to the surface of the wind turbine blade.

The method may further include contacting an upper surface of the wind turbine blade with a first friction pad coupled with the upper blade holding structure, operating the force transfer mechanism between the first friction pad and the upper blade holding structure and contacting a lower surface of the wind turbine blade with second friction pad coupled to the lower blade holding structure. The force transfer mechanism may include first and second friction elements. The first friction element includes a first friction surface configured to engage a surface of the wind turbine blade and a second angled surface extending at an acute angle to and extending along the central longitudinal axis of the wind turbine blade. The second friction element may include a third angled surface extending parallel to the second angled surface. In this case the method further includes contacting the second and third angled surfaces with each other to increase the force applied between the first friction surface and the surface of the wind turbine blade when the wind turbine blade is accelerated in a first direction during movement along a central longitudinal axis of the wind turbine blade.

The first friction element may further include a fourth angled surface extending at an acute angle to and along the central longitudinal axis of the blade and the second friction element may further include a fifth angled surface extending parallel to the fourth angled surface and at an acute angle to the central longitudinal axis. In this case the method further includes contacting the fourth and fifth angled surfaces with each other to increase the force applied between the first friction surface and the surface of the wind turbine blade when the wind turbine blade is accelerated in a second direction opposite to the first direction during movement along a central longitudinal axis of the wind turbine blade.

The force transfer mechanism may instead comprise a pivot mounting coupled to at least one of the upper or lower blade holding structures. The pivot mounting is further coupled to a friction element engaged with a surface of the wind turbine blade. The method then includes pivoting the friction element to increase the force applied between the friction element and the surface of the wind turbine blade when the wind turbine blade is accelerated during movement along a central longitudinal axis of the wind turbine blade.

Various additional advantages and features will become more readily apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain various examples embodying the invention.

DETAILED DESCRIPTION

This is a description of various illustrative and non-limiting examples of the invention. Like reference numerals throughout the various figures refer to like elements, components or features having the same general function. For this reason, and to eliminate redundancy, repeated discussion or explanation of such like elements, components or features may not be included in later described embodiments.

Figure 1:
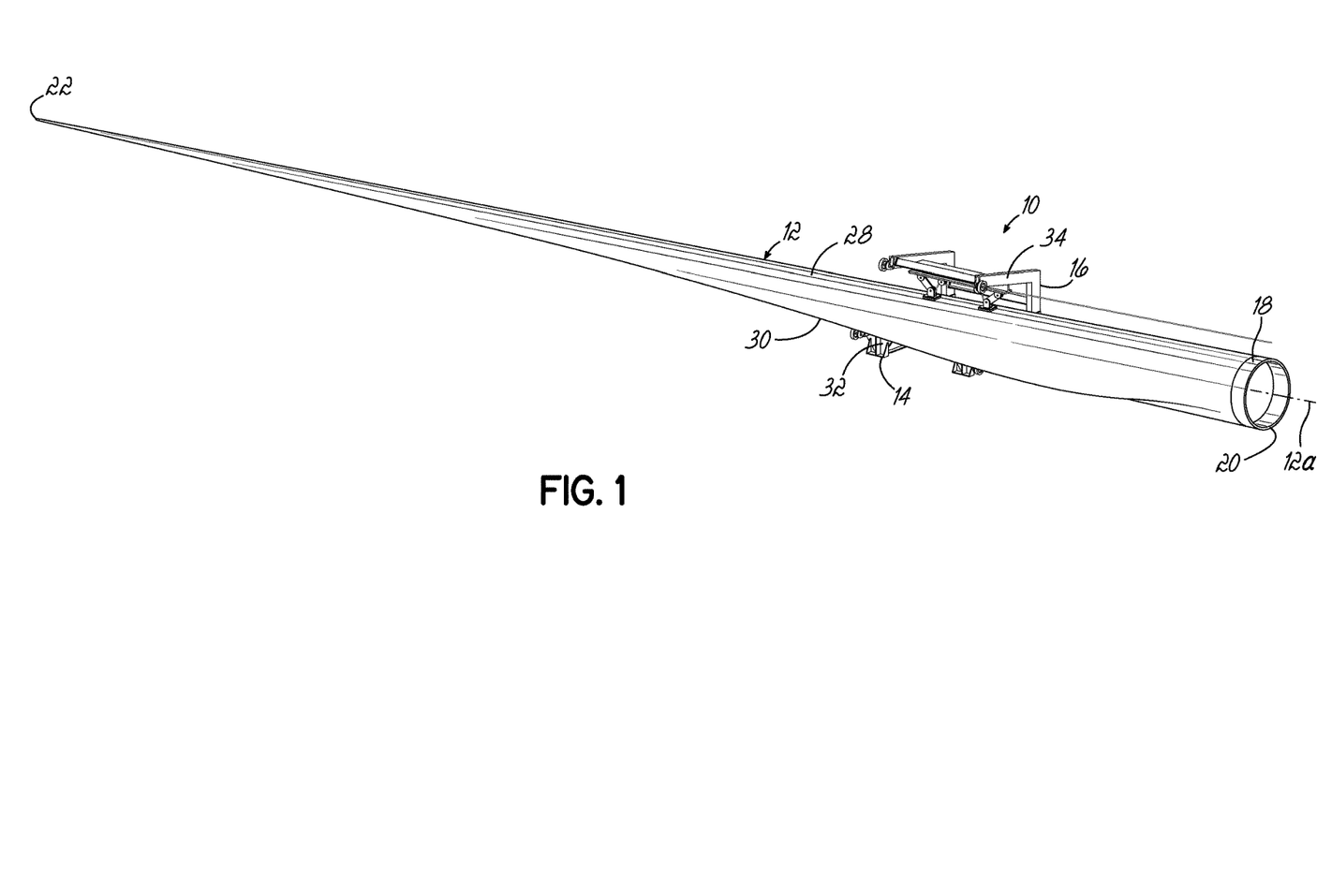
FIG. 1 is a perspective view illustrating a gripper according to one illustrative embodiment of the invention holding a wind turbine blade.
Figure 2:
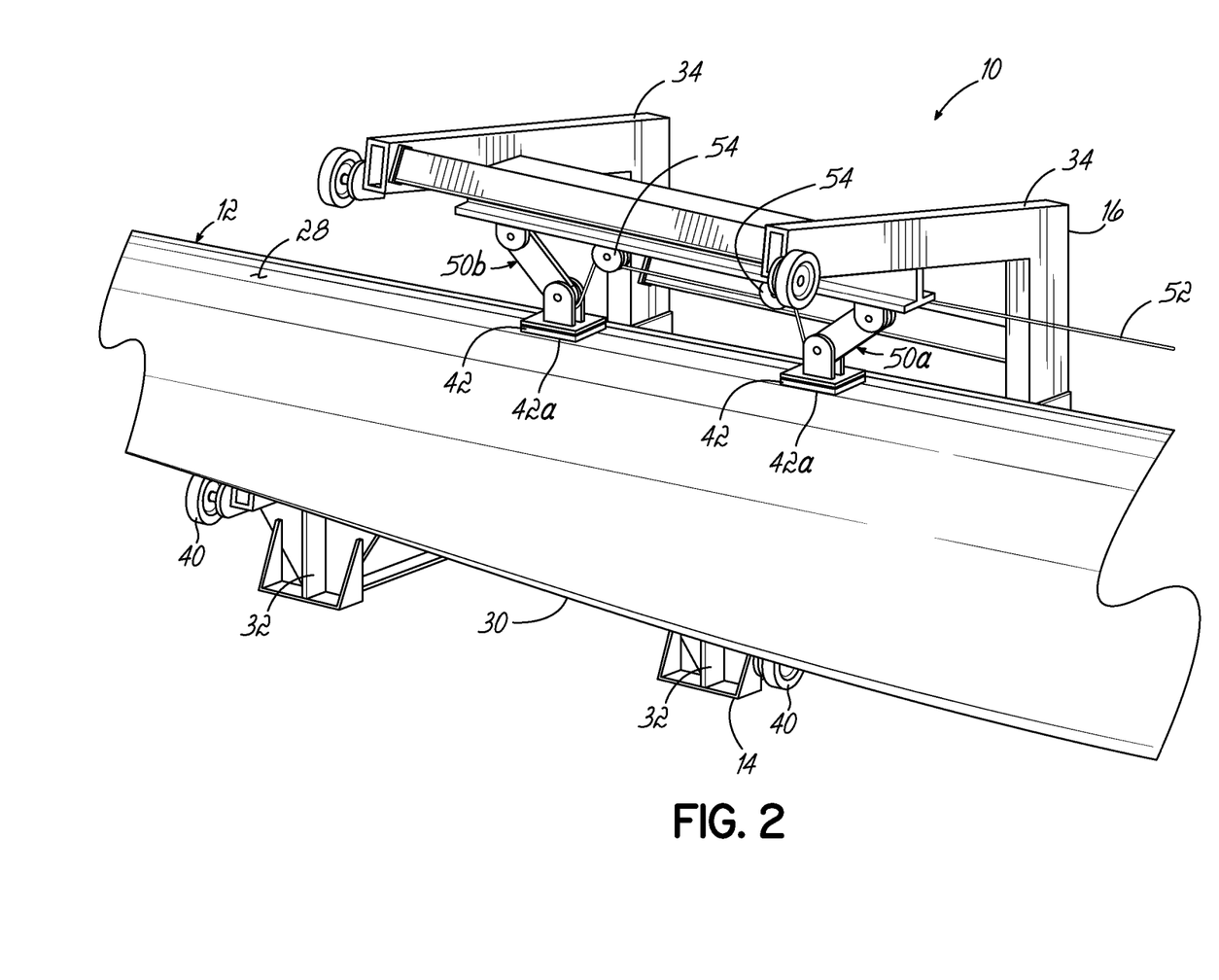
FIG. 2 is a perspective view of a portion of FIG. 1, but showing the gripper and a portion of the wind turbine blade enlarged, and the gripper engaged with the wind turbine blade.
Figure 3:
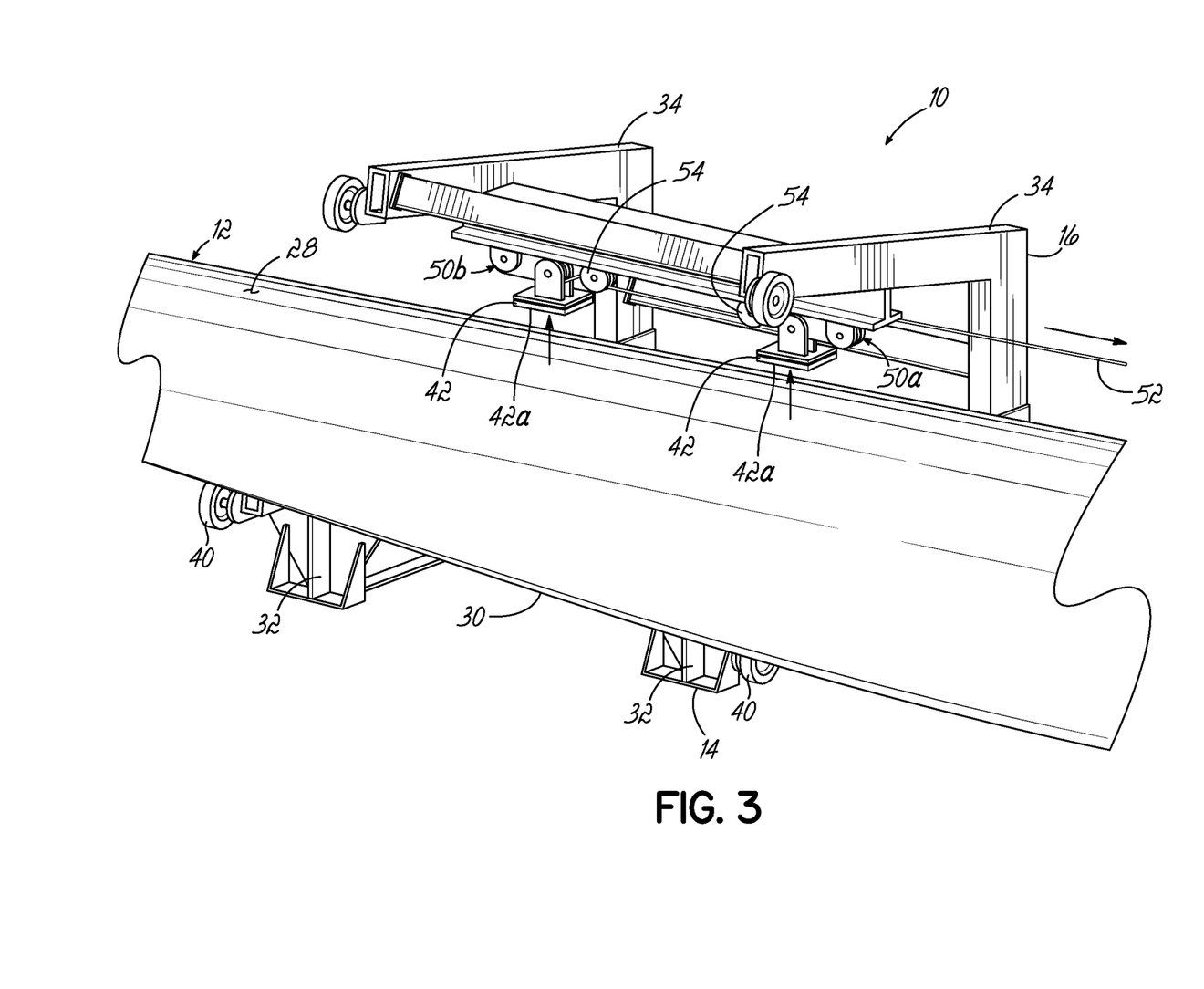
FIG. 3 is a perspective view similar to FIG. 2, but illustrating the gripper disengaged from the wind turbine blade.

Referring first to FIGS. 1-3, a gripper 10 is shown constructed in accordance with a first illustrative embodiment for holding a wind turbine blade 12 when the wind turbine blade 12 is being moved, such as during transportation and/or lifting operations. The gripper 10 generally includes a lower blade holding structure 14 configured to engage an underside of the wind turbine blade 12, and an upper blade holding structure 16 configured to engage an upper side of the wind turbine blade 12. As shown in FIG. 1, the wind turbine blade 12 includes a root end 18 having a root end face 20, and a tip 22 at the opposite end of the blade 12. The blade 12 extends along a central longitudinal axis 12*a* and also includes upper and lower surfaces 28, 30 adapted to be engaged by the gripper 10 as will be discussed further below. The blade holding structures 14, 16 are shown here as including rigid frames 32, 34 constructed from steel or another metal. However, the blade holding structures 14, 16 may take many forms. For example, the upper blade holding structure 16 may be a rigid frame structure similar to that shown, while the lower blade holding structure 14 may be replaced by partially or wholly non-rigid structure. The lower blade holding structure may comprise a flexible strap configuration (not shown) extending under the blade 12 and including one or more frictional surfaces (e.g., rubberized) designed to carry some or all of the weight of the blade 12.

Figure 4:
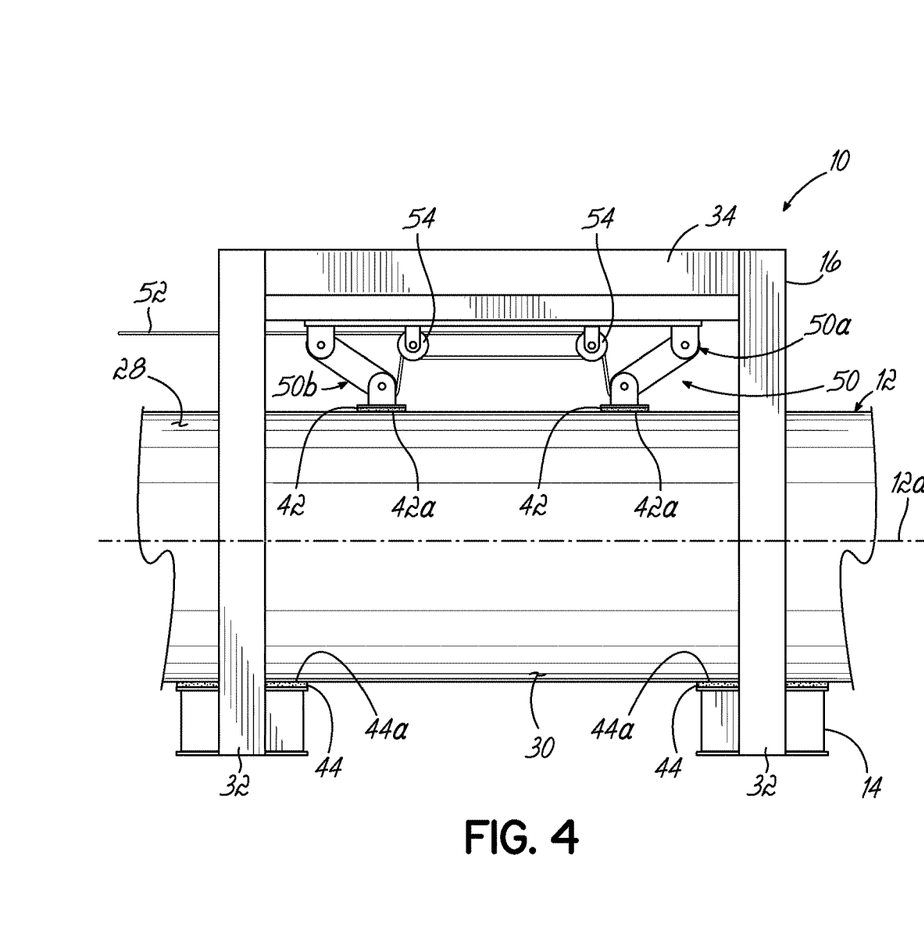
FIG. 4 is a plan view of the gripper as shown in FIG. 2.

As shown best in FIGS. 2, 3 and 4, the gripper 10 generally comprises a rigid frame structure having frame portions 32, 34. The lower frame portion 32 may further include wheels 40 for allowing the gripper 10 to be moved into and out of place with respect to the blade 12. It will be appreciated that the gripper 10 may be part of another apparatus, such as other forms of dollies, trailers, motor-driven transport vehicles, etc., for allowing the blade 12 to be transported, lifted or otherwise moved as desired. The gripper 10 further includes upper friction pads 42 and lower friction pads 44 (FIG. 4) for respectively engaging upper and lower surfaces 28, 30 of the blade 12. The surfaces 42*a*, 44*a* of the pads 42, 44 for engaging the blade 12 may be rubber or other high friction material. Specifically, first and second upper friction pads 42 are provided, as well as first and second lower friction pads 44. The gripper 10 is placed at a location along the length of the blade 12 approximately at the center of gravity of the blade 12 as shown in FIG. 1. However, other configurations may be used instead, and more than one gripper 10 may be used for moving a particular wind turbine blade 12. The weight of the blade 12 rests on the lower friction pads 44 and frame 32 while the upper friction pads 42 are selectively engageable with the upper surface 28 of the blade 12. As best shown in FIG. 4, the first and second upper friction pads 42 may be selectively engaged with the upper surface 28 of the blade 12 through the use of a linkage assembly 50. The linkage assembly 50 serves as a force transfer mechanism in this embodiment. Further, a cable 52 and pulleys 54 are used as shown in FIG. 4 so that the upper friction pads or elements 42 may be selectively engaged (FIGS. 2 and 4) and disengaged (FIG. 3) with respect to the upper surface 28 of the blade 12. The linkage assembly 50 may be self-locking in the engaged position shown in FIG. 2. Pulling the cable 52, such as by remote actuation, will release engagement of the upper friction pads 42 as shown in FIG. 3, while releasing the cable 52 will cause the pads 42 to fall against the blade surface 28 as shown in FIGS. 2 and 4. It will be appreciated that when the linkage system 50 is in the engaged position as shown in FIG. 4 with the first and second friction elements or pads 42 contacting the upper surface 28 of the wind turbine blade 12, the wind turbine blade 12 is securely held between the upper friction pads 42 and the lower friction pads 44. It will be appreciated that in each of the embodiments shown and described, the friction pad(s) associated with or connected to the force transfer mechanism may be at the upper or lower portion of the gripper 10, or at both the upper and lower portions of the gripper 10.

Figure 4A:
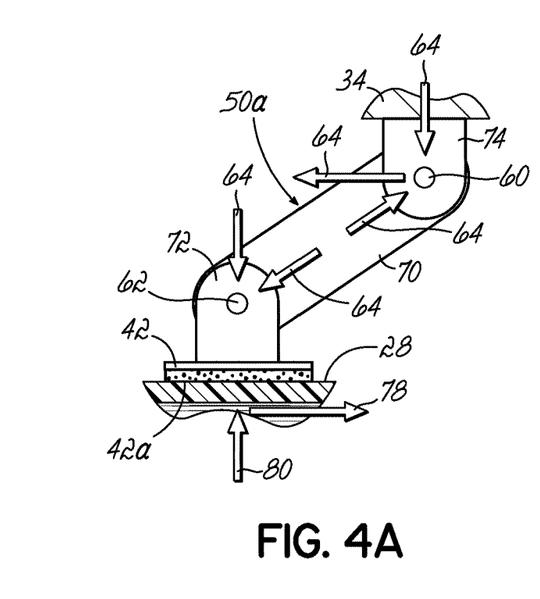
FIG. 4A is an enlarged view illustrating one of the linkage assemblies associated with the gripper of FIG. 4 and showing the various forces being applied with the linkage assembly.

Referring to FIG. 4A, the right hand portion 50*a* of linkage assembly 50 from FIG. 4 is illustrated in enlarged form. The various forces on the pivot points 60, 62 of the linkage assembly portion 50*a* are shown in FIG. 4A through the use of arrows 64 directed with respect to those pivot points 60, 62. The lengthwise linkage 70 is oriented at an acute angle relative to the longitudinal central axis 12*a* of the blade 12 (FIG. 4) and extends generally along the longitudinal central axis 12*a* of the blade 12. More specifically, the link or linkage 70 extends downwardly from right to left as viewed in FIG. 4A and at an acute angle relative to the axis 12*a*. The lengthwise, angled linkage 70 is pivotally coupled to a friction pad link 72 at one end and a link 74 rigidly secured to the frame 34 at the opposite end. This lengthwise, angled linkage 70 forces the friction pad 42 further against the outer surface 28 of the wind turbine blade 12 when there is an acceleration in the direction of the arrow 78. That is, when the wind turbine blade 12 accelerates during movement in the direction of the arrow 78, the force normal or perpendicular to the friction pad (as shown by arrow 80) increases due to the angular orientation of the link 70. It will be appreciated that the linkage assembly portion 50*b* on the left hand side of FIG. 4 will operate in the same manner but will increase the force normal to the first friction pad 42 when there is a positive or negative acceleration in the opposite direction from that shown by arrow 78 in FIG. 4A. It will be appreciated that the term "acceleration" or its various forms as used herein refers to the application of positive or negative acceleration forces and therefore encompasses the term "deceleration" as well. Thus, regardless of whether the acceleration is in one direction or the other along the longitudinal central axis 12*a* of the wind turbine blade 12, the first and second upper friction pads 42 will respectively prevent slippage of the wind turbine blade 12 with respect to the gripper 10.

Figure 5A:
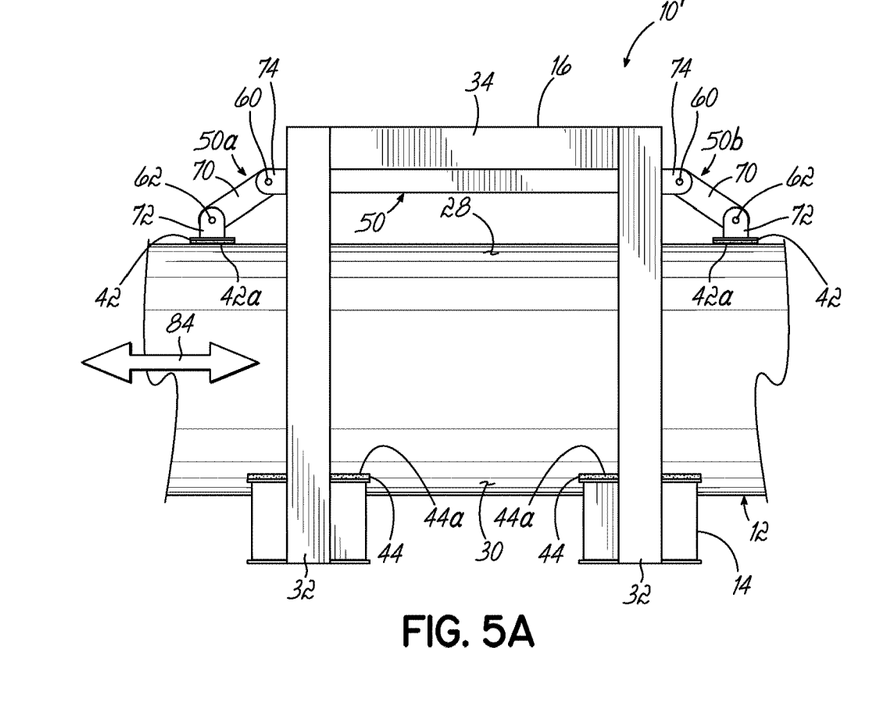
FIG. 5A is a plan view similar to FIG. 4, but illustrating another alternative embodiment for a linkage assembly associated with the gripper.
Figure 5B:
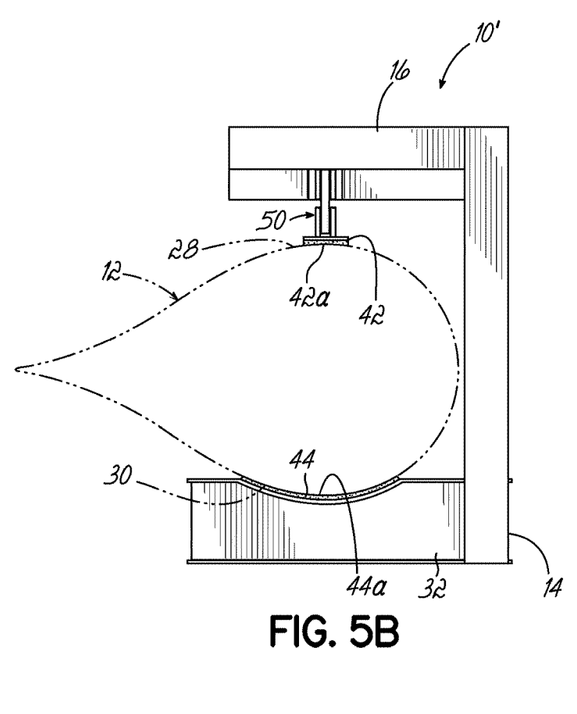
FIG. 5B is an end view showing the gripper of FIG. 5A.

FIGS. 5A and 5B illustrate a gripper configuration for an alternative gripper 10' that is very similar to the configuration shown in FIGS. 1-4. However, the linkage assembly portions 50*a*, 50*b* are shown positioned outside of the frame 34 of the gripper 10. In this embodiment, the cable and pulley release mechanism has also been deleted for clarity purposes. Like reference numerals in this embodiment refer to like structure as generally described with regard to the embodiment of FIGS. 1-4. The functions of the various components are therefore as described above and need not be repeated. In particular, regardless of whether acceleration forces occur in either direction along the central longitudinal axis 12*a* (as indicated by double-headed arrow 84), the linkage assembly 50 will prevent slippage of the blade 12 in the same manner as described in connection with FIG. 1 through FIG. 4A.

Figure 6A:
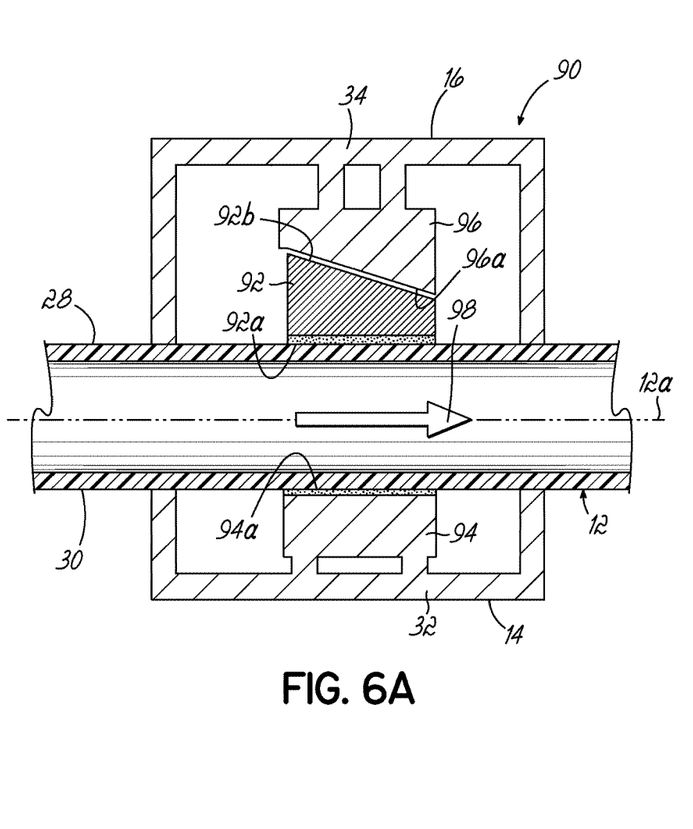
FIG. 6A is a schematic view, taken in cross section, illustrating another alternative embodiment for a gripper of the present invention.

FIG. 6A illustrates an alternative embodiment for a gripper 90 in schematic form. Here, a linkage assembly is not used. Instead, a first friction pad 92 again engages or contacts an upper surface 28 of the wind turbine blade 12 and a lower friction element 94 having a friction pad or surface 94*a* engaging or contacting a lower surface 30 of the wind turbine blade 12. The lower friction pad or element 94 is rigidly coupled to the lower frame 32 or blade holding structure 14. In this embodiment, a force transfer mechanism, which is designed to prevent slippage between the gripper 90 and the blade 12, uses a feature of the friction pad 92. This first or upper friction element 92 includes a first friction surface 92*a* engaging upper surface 28 of the wind turbine blade 12 and a second angled surface 92b extending along but at an acute angle to the central longitudinal axis 12a of the wind turbine blade 12. A second friction element 96 includes a third surface, i.e., angled surface 96a extending parallel to and engaged with or contacting the second angled surface 92b. The second and third angled surfaces 92b, 96a contact and move against each other to increase the force applied between the first friction surface 92a and the upper surface 28 of the wind turbine blade 12 (in a direction normal to the blade surface 28 at that location) when the wind turbine blade 12 is accelerated in a first direction (arrow 98) during movement along a central longitudinal axis 12a of the wind turbine blade 12. In this example, as the wind turbine blade 12 accelerates in the direction of the arrow 98 along its central longitudinal axis 12a, the interaction between the angled surfaces 92b, 96a will cause friction surface 92a to apply greater force in a direction normal to the upper surface 28 of the wind turbine blade 12 at the location of friction pad contact thereby increasing the gripping force or friction force between the first friction surface 92a and the upper surface 28 of the wind turbine blade 12. It will be appreciated that another similarly designed set of friction elements would be used to accommodate acceleration forces in the opposite direction to the arrow 98 shown in FIG. 6A. That is, another gripping element or at least another pair of friction elements similar to the first and second friction elements 92, 96 would be used but the angled, parallel surfaces 92b, 96a would be oriented in a manner opposite of that shown in FIG. 6A. That is, the angled, engaged surfaces 92b, 96a would extend from right to left in a downward direction instead of from left to right in a downward direction as viewed in FIG. 6A.

Figure 6B:
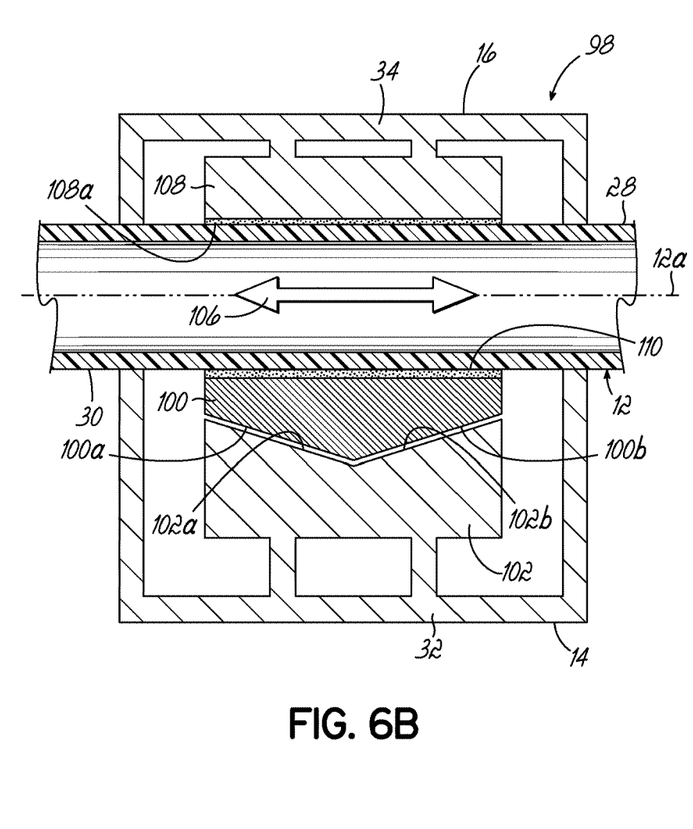
FIG. 6B is a schematic view, taken in cross section, illustrating another alternative embodiment for a gripper of the present invention.

FIG. 6B illustrates another alternative embodiment of a gripper 98 in which engaging or interacting friction elements 100, 102 are shown on the underside of the blade 12 (instead of the upper side of the blade 12) and further include angled, parallel pairs of engaging surfaces 100a, 102a and 100b, 102b respectively oriented in opposite directions. These features provide the force transfer mechanism generally described herein. This configuration therefore accommodates accelerations in both directions as indicated by the double headed arrow 106 of FIG. 6B. An upper friction element 108 is rigidly coupled to the upper frame 34 and engages the upper, curved surface 28 of the wind turbine blade 12 with frictional force applied by a frictional pad or surface 108a, while the lower first and second friction elements 100, 102 include angled, respectively parallel surface portions 100a, 102a and 100b, 102b for increasing the gripping or frictional force between the first friction element 100 and the lower surface 30 of the blade 12 regardless of whether the blade 12 is accelerating in the left to right direction or the right to left direction. The first friction element 100 includes a first friction surface 110 engaged with or contacting the lower blade surface 30 and a second angled surface 100a interacting in contact with a third surface, i.e., angled surface 102a of the second friction element 102. The element 100 further includes a fourth surface, i.e., angled surface 100b extending along and at an acute angle to the central longitudinal axis 12a. The second friction element 102 further includes a fifth angled surface 102b extending parallel to the fourth angled surface 100b, i.e., at an acute angle to the central longitudinal axis 12a. The fourth and fifth angled surfaces 100b, 102b contact and move against each other to increase the force applied between the first friction surface 110 and the lower surface 30 of the wind turbine blade 12 (in a direction normal to the blade surface 30 at that location) when the wind turbine blade 12 is placed under an acceleration force in a second direction opposite to the first direction (arrow 98 in FIG. 6A) during transportation or other movement of the blade 12 along a central longitudinal axis 12a of the blade 12.

Figure 6C:
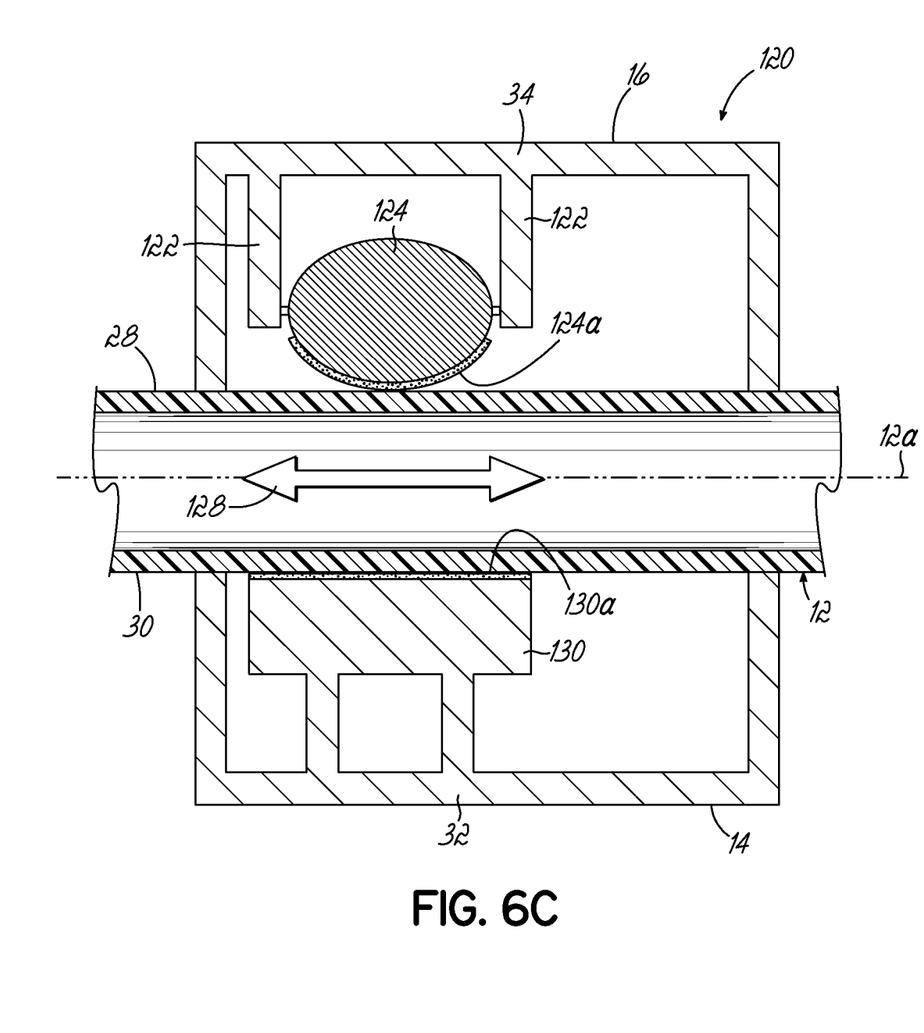
FIG. 6C is a schematic view, taken in cross section, illustrating another alternative embodiment for a gripper of the present invention.

FIG. 6C illustrates another alternative embodiment of a gripper 120 generally similar to the schematic illustrations of FIGS. 6A and 6B but illustrating another form of force transfer mechanism. In this embodiment, the force transfer mechanism comprises a pivot mounting 122 coupled to the upper blade holding structure or frame 34. It will be appreciated that such a pivot mounting 122 may instead or additionally be coupled to another portion of the blade holding structure, such as the lower blade holding structure 14. The pivot mounting 122 is further coupled to a convexly curved friction element 124 having a frictional element or pad 124a that engages or contacts the surface 28 of the wind turbine blade 12. A stationary friction element 130 is rigidly coupled to the lower frame 14 and carries the weight of the blade 12. Element 130 is frictionally engaged with surface 30 by a pad or frictional surface 130a. When the wind turbine blade 12 accelerates in either direction along its central longitudinal axis 12a as indicated by double-headed arrow 128, the friction element 124 will pivot while it is engaged in contact with the blade surface 28 as appreciated from a review of FIG. 6C. This movement will increase the force normal to the blade 12 and between the convexly curved friction pad outer surface 124a and the blade surface 28 at the contact location between the friction element 124 and the blade surface 28. Effectively, this curved surface 124a forms acute angles on opposite end portions of the curved friction element 124 with respect to the central longitudinal blade axis 12a and, therefore, the effect is the same as the embodiment shown in FIG. 6B.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A gripper for holding a wind turbine blade when the wind turbine blade is being moved, comprising:
   a lower blade holding structure configured to engage an underside of the wind turbine blade;
   an upper blade holding structure configured to engage an upper side of the wind turbine blade; and
   a force transfer mechanism operatively coupled to at least one of the lower or upper blade holding structures, the force transfer mechanism configured to apply a clamping force between the lower blade holding structure and the underside of the wind turbine blade and/or between the upper blade holding structure and the upper side of the wind turbine blade, the force transfer mechanism further configured to increase the clamping force applied between the lower blade holding structure and the underside of the wind turbine blade and/or between the upper blade holding structure and the upper side of the wind turbine blade in response to the wind turbine blade accelerating during movement along a central longitudinal axis of the wind turbine blade.

2. The gripper of claim 1, wherein the force transfer mechanism further comprises a linkage assembly.

3. The gripper of claim 2, wherein the linkage assembly further comprises a first link coupled to a first friction pad having a first surface configured to contact a surface of the wind turbine blade, and wherein the first link defines an acute angle between a length thereof and the central longitudinal axis of the wind turbine blade.

4. The gripper of claim 3, wherein the linkage assembly further comprises a second link coupled to a second friction pad having a second surface configured to contact a surface of the wind turbine blade, and wherein the second link defines an acute angle between a length thereof and the central longitudinal axis of the wind turbine blade.

5. The gripper of claim 3, further comprising a release mechanism coupled to the linkage assembly and operative to allow the first friction pad to be selectively disengaged from the surface of the wind turbine blade.

6. The gripper of claim 1, wherein the force transfer mechanism is coupled to the upper blade holding structure, and further comprising a friction pad coupled to the lower blade holding structure and configured to engage the underside of the wind turbine blade.

7. The gripper of claim 1, wherein the force transfer mechanism comprises first and second friction elements, the first friction element including a first friction surface configured to engage a surface of the wind turbine blade and a second angled surface extending along and at an acute angle to the central longitudinal axis of the wind turbine blade, and the second friction element including a third angled surface extending parallel to the second angled surface, and wherein the second and third angled surfaces contact each other to increase the clamping force applied between the first friction surface and the surface of the wind turbine blade in response to the wind turbine blade accelerating in a first direction during movement along a central longitudinal axis of the wind turbine blade.

8. The gripper of claim 7, wherein the first friction element further includes a fourth angled surface extending along and at an acute angle to the central longitudinal axis and the second friction element further includes a fifth angled surface extending parallel to the fourth angled surface, the fourth and fifth angled surfaces contacting each other to increase the clamping force applied between the first friction surface and the surface of the wind turbine blade in response to the wind turbine blade accelerating in a second direction opposite to the first direction during movement along a central longitudinal axis of the wind turbine blade.

9. The gripper of claim 1, wherein the force transfer mechanism further comprises a pivot mounting coupled to at least one of the upper or lower blade holding structures, and wherein the pivot mounting is further coupled to a friction element engageable with a surface of the wind turbine blade, whereby the friction element pivots to increase the clamping force applied between the friction element and the surface of the wind turbine blade in response to the wind turbine blade accelerating during movement along a central longitudinal axis of the wind turbine blade.

10. A method of holding a wind turbine blade when the wind turbine blade is being transported, comprising:
  providing the gripper according to claim 1;
  engaging the underside of the wind turbine blade with the lower blade holding structure;
  engaging the upper side of the wind turbine blade with the upper blade holding structure;
  applying a clamping force between the lower blade holding structure and the underside of the wind turbine blade and/or between the upper blade holding structure and the upper side of the wind turbine blade, and
  increasing the clamping force applied between the lower blade holding structure and the underside of the wind turbine blade and/or between the upper blade holding structure and the upper side of the wind turbine blade using the force transfer mechanism in response to the wind turbine blade accelerating during movement along the central longitudinal axis of the wind turbine blade.

11. The method of claim 10, further comprising:
  increasing the clamping force through the use of a linkage assembly.

12. The method of claim 11, further comprising:
  increasing the clamping force through a first link coupled to a first friction pad contacting a surface of the wind turbine blade, wherein the first link defines an acute angle between a length thereof and the central longitudinal axis of the wind turbine blade.

13. The method of claim 12, further comprising:
  increasing the clamping force through a second link coupled to a second friction pad contacting a surface of the wind turbine blade, wherein the second link defines an acute angle between a length thereof and the central longitudinal axis of the wind turbine blade.

14. The method of claim 12, further comprising:
  selectively engaging and disengaging the first friction pad with respect to the surface of the wind turbine blade.

15. The method of claim 10, further comprising:
  contacting an upper surface of the wind turbine blade with a first friction pad coupled with the upper blade holding structure;
  operating the force transfer mechanism between the first friction pad and the upper blade holding structure; and
  contacting a lower surface of the wind turbine blade with second friction pad coupled to the lower blade holding structure.

16. The method of claim 10, wherein the force transfer mechanism comprises first and second friction elements, the first friction element including a first friction surface configured to engage a surface of the wind turbine blade and a second angled surface extending along and at an acute angle to the central longitudinal axis of the wind turbine blade, and the second friction element including a third angled surface extending parallel to the second angled surface, the method further comprising:
  contacting the second and third angled surfaces with each other to increase the clamping force applied between the first friction surface and the surface of the wind turbine blade in response to the wind turbine blade accelerating in a first direction during movement along a central longitudinal axis of the wind turbine blade.

17. The method of claim 16, wherein the first friction element further includes a fourth angled surface extending along and at an acute angle to the central longitudinal axis and the second friction element further includes a fifth angled surface extending parallel to the fourth angled surface, the method further comprising:
  contacting the fourth and fifth angled surfaces with each other to increase the clamping force applied between the first friction surface and the surface of the wind turbine blade in response to the wind turbine blade accelerating in a second direction opposite to the first direction during movement along a central longitudinal axis of the wind turbine blade.

18. The method of claim 10, wherein the force transfer mechanism further comprises a pivot mounting coupled to at least one of the upper or lower blade holding structures, and wherein the pivot mounting is further coupled to a friction element engaged with a surface of the wind turbine blade, the method further comprising:

pivoting the friction element to increase the clamping force applied between the friction element and the surface of the wind turbine blade in response to the wind turbine blade accelerating during movement along a central longitudinal axis of the wind turbine blade.

19. A gripper for holding a wind turbine blade when the wind turbine blade is being moved, comprising:
   a lower blade holding structure configured to engage an underside of the wind turbine blade;
   an upper blade holding structure configured to engage an upper side of the wind turbine blade; and
   a force transfer mechanism operatively coupled to at least one of the lower or upper blade holding structures, the force transfer mechanism configured to increase a clamping force applied between the lower blade holding structure and the underside of the wind turbine blade and/or between the upper blade holding structure and the upper side of the wind turbine blade in response to the wind turbine blade accelerating during movement along a central longitudinal axis of the wind turbine blade,
   wherein the force transfer mechanism comprises first and second friction elements, the first friction element including a first friction surface configured to engage a surface of the wind turbine blade and a second angled surface extending along and at an acute angle to the central longitudinal axis of the wind turbine blade, and the second friction element including a third angled surface extending parallel to the second angled surface, and wherein the second and third angled surfaces are configured to contact each other to increase the clamping force applied between the first friction surface and the surface of the wind turbine blade in response to the wind turbine blade accelerating in a first direction during movement along a central longitudinal axis of the wind turbine blade.

20. The gripper of claim 19, wherein the first friction element further includes a fourth angled surface extending along and at an acute angle to the central longitudinal axis and the second friction element further includes a fifth angled surface extending parallel to the fourth angled surface, the fourth and fifth angled surfaces contacting each other to increase the clamping force applied between the first friction surface and the surface of the wind turbine blade in response to the wind turbine blade accelerating in a second direction opposite to the first direction during movement along a central longitudinal axis of the wind turbine blade.

* * * * *